United States Patent [19]
Toyama et al.

[11] Patent Number: 5,528,531
[45] Date of Patent: Jun. 18, 1996

[54] SERIAL-TO-PARALLEL MULTIPLIER

[75] Inventors: Akira Toyama; Minoru Takeda, both of Tokyo, Japan

[73] Assignee: Nippon Precision Circuits Inc., Tokyo, Japan

[21] Appl. No.: 282,190

[22] Filed: Jul. 28, 1994

[30]     Foreign Application Priority Data

Aug. 26, 1993 [JP] Japan .................. 5-211569

[51] Int. Cl.$^6$ ........................... G06F 7/52
[52] U.S. Cl. ................................... 364/759
[58] Field of Search ..................... 364/754, 757, 364/758, 759

[56]         References Cited
         U.S. PATENT DOCUMENTS

3,610,907 10/1971 Taylor ........................ 364/759
3,617,723 11/1971 Melvin ....................... 364/759
4,013,879  3/1977 Bornmann et al. ............ 364/757
4,777,614 10/1988 Ward ......................... 364/754
4,939,687  7/1990 Hartley et al. ............... 364/757
4,994,997  2/1991 Martin et al. ................ 364/759

Primary Examiner—Roy N. Envall, Jr.
Assistant Examiner—Chuong D. Ngo
Attorney, Agent, or Firm—Jordan and Hamburg

[57]            ABSTRACT

A serial-to-parallel type multiplier capable of performing a highspeed calculation with high precision includes a selection circuit provided in a unit calculation block, an output of this selection circuit being input into an adder, and the selection circuit selectively outputs either a logic product between a multiplier bit to be input into this unit calculation block and a multiplicand bit input into this unit calculation block within one unit time period or a logic product between a multiplier bit to be input into this unit calculation block and a multiplicand bit input into this unit calculation block within a unit time period prior to the above-described one unit time period.

21 Claims, 7 Drawing Sheets

SERIAL-TO-PARALLEL MULTIPLIER

BACKGROUND OF THE INVENTION

The present invention relates to a multiplier, and specifically, is directed to a multiplier generally known as a serial/parallel multiplier.

Figure 6:
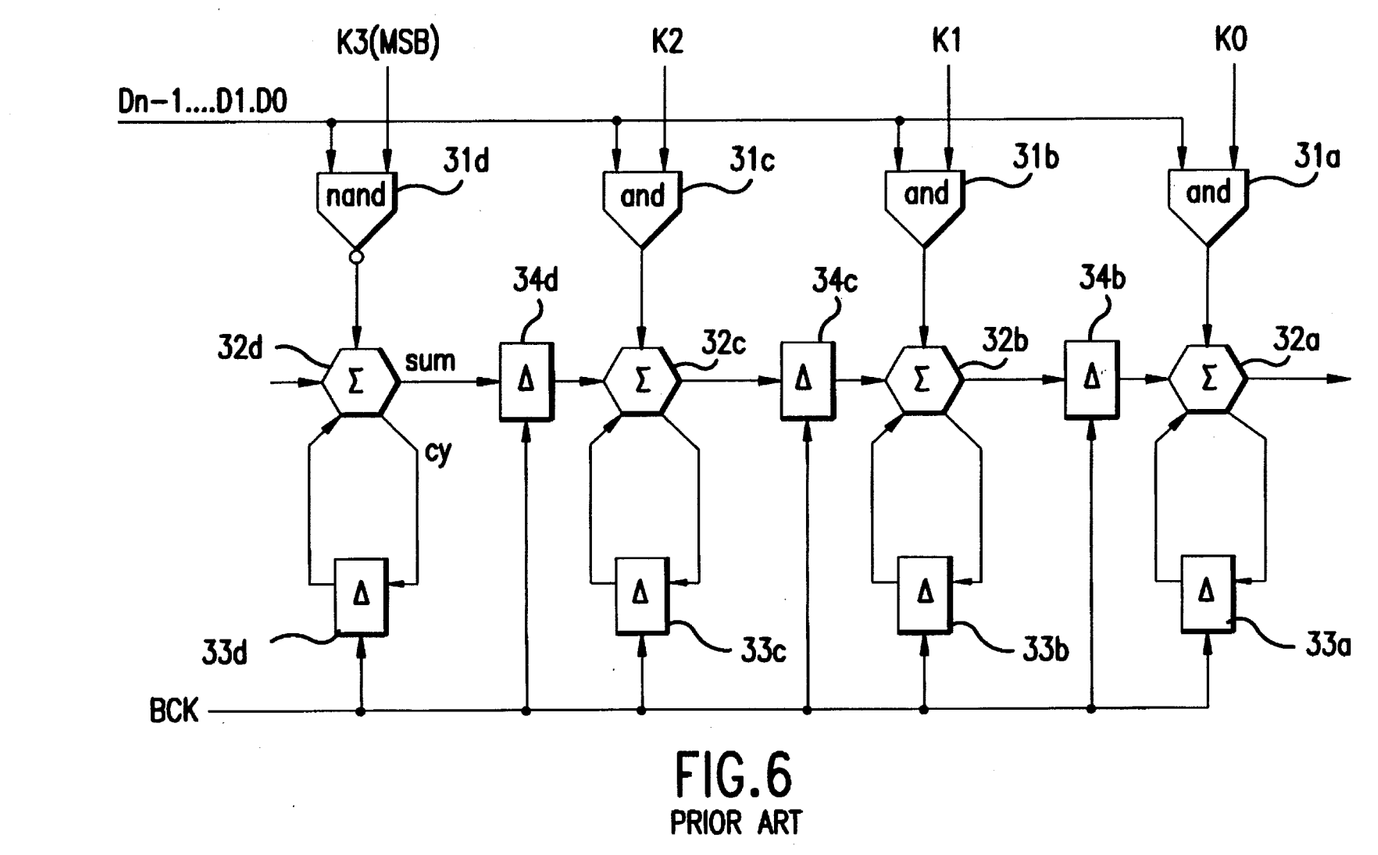
FIG. 6 is a block diagram showing the structure of a conventional serial/parallel multiplier.
Figure 7:
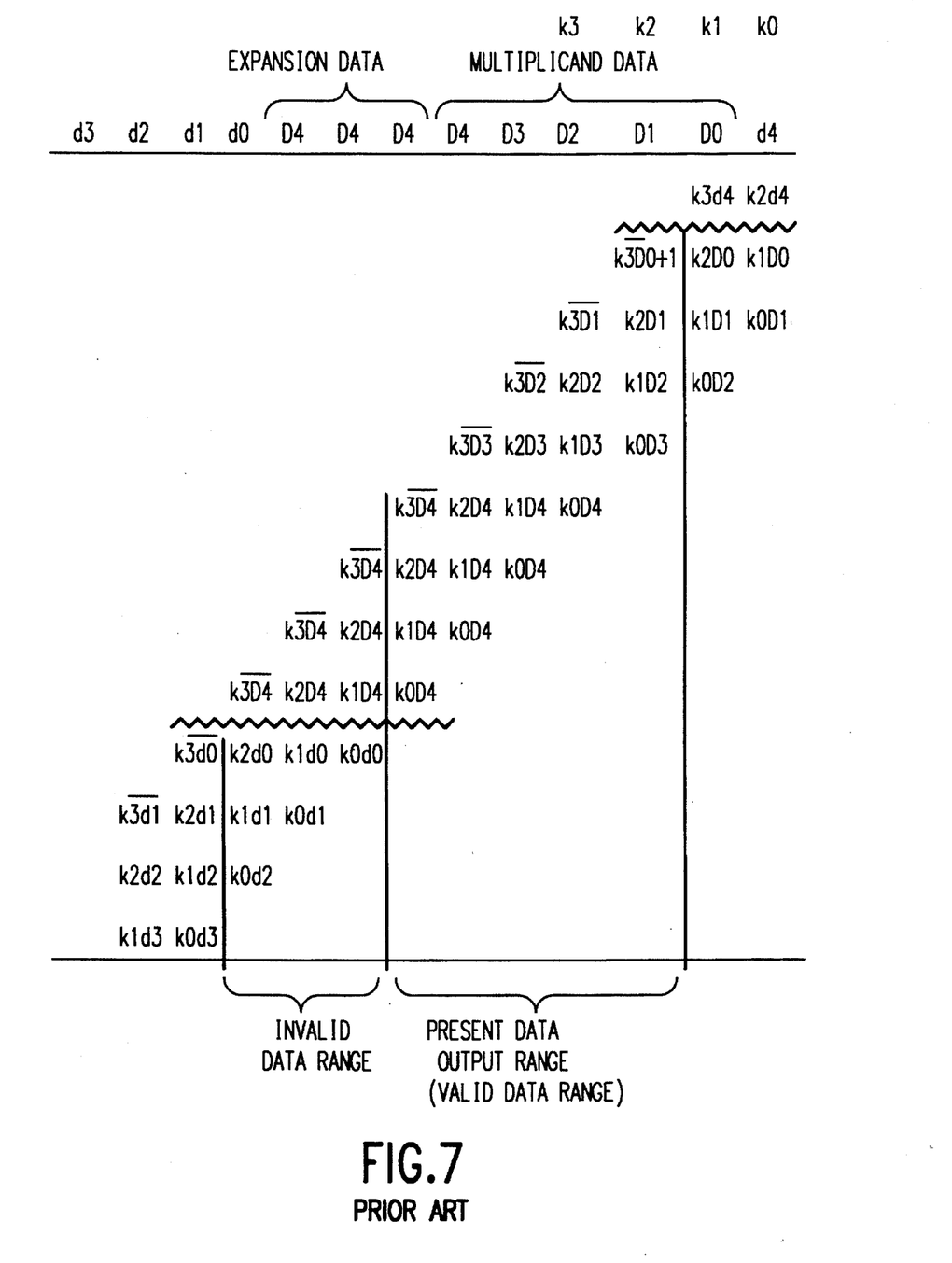
FIG. 7 is a graph illustrating the calculating operation effected in the prior art multiplier of FIG. 6.

FIG. 6 is a block diagram showing an arrangement of a conventional serial/parallel multiplier. FIG. 7 is an explanatory drawing showing a calculating operation performed by the conventional serial/parallel multiplier of FIG. 6. In the following explanation, multipliers K0 to K3 (K0 denotes an LSB, and K3 represents a sign bit) indicated by a 2's complement are multiplied by multiplicands D0 to D4 (D0 is an LSB, and D4 denotes a sign bit) indicated by a 2's complement.

First, a description will be made of each of the structural elements of the serial/parallel (serial-to-parallel) multiplier indicated in FIG. 6. AND gates 31a to 31c and a NAND gate 31d (referred to as logical product circuits where necessary) perform logical product operations for the multipliers K0 to K3 which are input in parallel into the serial/parallel multiplier, and for the multiplicands D0 to D4 which are sequentially input in series, for every 1 clock, to the multiplier. Full adders 32a to 32d add the outputs from the logical product circuits 31a to 31d, the outputs derived from the previous stage circuit, and the carry output, thereby outputting the added (summation) output to the next stage. Delay circuits 33a to 33d delay the carry outputs obtained from the full adders 32a to 32d by 1 clock time period in response to a clock signal BCK. Delay circuits 34d to 34b delay summation outputs from the full adders 32d to 32b by 1 clock time period, thereby supplying delayed summation outputs to the full adders 32c to 32a.

Referring now to FIG. 7, the operation of the serial/parallel multiplier shown in FIG. 6 will be explained. It should be noted that the following explanation is made based on the below-mentioned assumptions. It is now assumed that the multipliers K0 to K3 are not changed even when the multiplicands D0 to D4 are changed from present data to subsequent data. It is also assumed that the multiplicands D0 to D4 are continuously changed from present data to subsequent data, that is, when the multiplicands D0 to D4 are changed from the present data to the subsequent data, the data is input into the multiplier at intervals of one clock period. It should be understood that 3-bit expansion data bits D4 to D4 shown in FIG. 7 are identical to sign bits D4. In a serial/parallel multiplier, a correct calculation result can be obtained by employing the expansion data. Generally speaking, such expansion data is definitely required for the normal serial/parallel multiplier.

During a clock period in which the first multiplicand bit D0 of the present data is input to the multiplier, "K0D0", "K1D0", "K2D0" and "$\overline{K3D0}$" (namely, inverted logic value of K3D0) are respectively output from the logical product circuits 31a to 31d. In the full adders 32a to 32d, a predetermined adding operation is carried out in response to these outputs from the AND circuits 31a to 31d and other signals.

Substantially the same operation as above is carried out also for the respective clock periods of the second multiplicand bit D1 and the third multiplicand bit D2 of the present data.

In a clock time period during which the fourth multiplicand bit D3 of the present data is input to the multiplier, first calculation data regarding the present data is newly output

2 from the multiplier. In other words, the least significant bit (LSB) component of "$(\overline{K3D0}+1)+(K2D1)+(K1D2)+(K0D3)$" is output from the full adder 32a as this first calculation data, and the upper digit bit components are added to the subsequent outputs (see FIG. 7).

A similar operation is carried out also in a clock time period during which the fifth multipli and bit D4 of the present data and the 3-bit expansion data bits D4 to D4 are input to the multiplier. The second to fifth calculation data of the present data are output from the full adder 12a.

The calculation (multiplication) results of the present data are obtained as described above. That is, the respective data within the present data output range shown in FIG. 7 are added to each other in the vertical direction in a similar manner to the normal adding calculation, thereby obtaining the calculation (multiplication) results of the present data.

When all of the clock time periods during which the expansion data D4 to D4 of the present data are entered into the multiplier are completed, a subsequent clock time period is commenced during which the first multiplicand bit d0 of the next data is input to the multiplier. At this time, $(\overline{K3D4})+(K2D4)+(K1D4)+K0d0)$ are output from the full adder 12a (see FIG. 7). That is to say, data in which the present data and the subsequent data are mixed are output.

Also, in clock time periods during which the second multiplicand bit d1 and the third multiplicand bit d2 of the next data are input to the multiplier, data in which the present data and subsequent data are mixed are output. As a consequence, the data output from the full adder 32a during these three clock periods becomes invalid data as represented in FIG. 7, i.e. data which cannot be utilized as calculation (multiplication) results.

As previously stated, in the conventional serial-to-parallel multiplier there are time periods during which data are output in which the present data and the next data are mixed. The data during these time periods become invalid data, that is, such data cannot be used as calculation (multiplication) results. Therefore, the calculation time period including the time period for calculating such invalid data is prolonged, and it is difficult to carry out high-speed, high-precision multiplication.

SUMMARY OF THE INVENTION

An object of the present invention is to provide a multiplier capable of performing high-speed, high precision multiplication.

In accordance with an aspect of the present invention, a multiplier circuit multiplies a multiplier formed of a plurality of parallel input multiplier bits by a multiplicand formed of a plurality of multiplicand bits which are sequentially input in series form for each of a plurality of predetermined time periods. The multiplier circuit includes a plurality of series-connected unit calculation blocks, each unit calculation block having the multiplier bit and the multiplicand bit input thereto in units of one bit. At least some of the unit calculation blocks include a logical product circuit for obtaining a logical product between a respective multiplier bit corresponding to each unit calculation block and each multiplicand bit, and for producing an output in response thereto; an adder for adding the output from the logical product circuit, an output from the previous stage of the unit calculation blocks and a carry output therefrom, and for outputting a sum output to the next stage of the unit calculation blocks; a first delay circuit for delaying the carry output of the adder for a predetermined time period and inputting the delayed carry output to the adder, to thereby obtain a multiplication result of the multiplier and the multiplicand based upon the output from a final stage of the unit calculation blocks; and a first selection circuit for selectively outputting to the adder either a logic product of the multiplier bit input to the unit calculation block and the multiplicand bit input to the unit calculation block for a one unit period, or a logic product of the multiplier bit input to the unit calculation block and the multiplicand bit input to the unit calculation block during a unit time period preceding the one unit period. The multiplier circuit further includes a second delay circuit connected with the unit calculation blocks for delaying an output of a previous stage of the unit calculation blocks for a predetermined time period to produce a delayed output, and for inputting the delayed output into a next stage of the unit calculation blocks.

Each unit calculation block further includes a second selection circuit connected with the first delay circuit and the adder for selecting an input supplied to the adder from either a carry output of the adder delayed for a predetermined time period, or a signal having a predetermined value.

The second selection circuit includes a selector switch having an output connected to an input of the first delay circuit, a first input connected to an output of the adder and a second input connected to a terminal for receiving the signal having the predetermined value.

There are four unit calculation blocks, and the logical product circuit of three of the unit calculation blocks includes an AND gate, and the logical product circuit of the fourth of the unit calculation blocks includes a NAND gate.

The second delay circuit includes a plurality of delay elements, each delay element being connected between adders of adjacent unit calculations blocks.

In the first embodiment of the invention, the first selection circuit includes a third delay circuit having an output connected to an input of the adder, and a selector switch having an input connected with an output of the logical product circuit, a first output connected with an input of the third delay circuit and a second output connected directly to the input of the adder.

In the second embodiment of the invention, the first selection circuit includes a delay circuit having an output connected with an input of the logical product circuit, and a selector switch having an input connected to receive the multiplicand, a first output connected with an input of the delay circuit and a second output connected directly to the input of the logical product circuit.

In accordance with a first embodiment of the present invention, a multiplier circuit multiplies a multiplier formed of a plurality of parallel input multiplier bits by a multiplicand formed of a plurality of multiplicand bits which are sequentially input in series form for each of a plurality of predetermined time periods. The multiplier circuit includes a plurality of series-connected unit calculation blocks, each unit calculation block having the multiplier bit and the multiplicand bit input thereto in units of one bit. At least some of the unit calculation blocks include a logical product circuit for obtaining a logical product between a respective the multiplier bit corresponding to each unit calculation block and each multiplicand bit, and for producing an output in response thereto; an adder for adding the output from the logical product circuit, an output from the previous stage of the unit calculation blocks and a carry output therefrom, and for outputting a sum output to the next stage of the unit calculation blocks; a first delay circuit for delaying the carry output of the adder for a predetermined time period and inputting the delayed carry output to the adder, to thereby obtain a multiplication result of the multiplier and the multiplicand based upon the output from a final stage of the unit calculation blocks; a first selection circuit for selectively outputting to the adder either a logic product of the multiplier bit input to the unit calculation block and the multiplicand bit input to the unit calculation block for a one unit period, or a logic product of the multiplier bit input to the unit calculation block and the multiplicand bit input to the unit calculation block during a unit time period preceding the one unit period, the first selection circuit including a second delay circuit having an output connected to an input of the adder, and a selector switch having an input connected with an output of the logical product circuit, a first output connected with an input of the second delay circuit and a second output connected directly to the input of the adder; and a second selection circuit connected to the first delay circuit and the adder for selecting an input supplied to the adder from either a carry output of the adder delayed for a predetermined time period, or a predetermined value. The multiplier circuit further includes a third delay circuit connected with the unit calculation blocks for delaying an output of a previous stage of the unit calculation blocks for a predetermined time period to produce a delayed output, and for inputting the delayed output into a next stage of the unit calculation blocks.

In accordance with a second embodiment of the present invention, a multiplier circuit multiplies a multiplier formed of a plurality of parallel input multiplier bits by a multiplicand formed of a plurality of multiplicand bits which are sequentially input in series form for each of a plurality of predetermined time periods. The multiplier circuit includes a plurality of series-connected unit calculation blocks, each unit calculation block having the multiplier bit and the multiplicand bit input thereto in units of one bit. At least some of the unit calculation blocks include a logical product circuit for obtaining a logical product between a respective the multiplier bit corresponding to each unit calculation block and each multiplicand bit, and for producing an output in response thereto; an adder for adding the output from the logical product circuit, an output from the previous stage of the unit calculation blocks and a carry output therefrom, and for outputting a sum output to the next stage of the unit calculation blocks; a first delay circuit for delaying the carry output of the adder for a predetermined time period and inputting the delayed carry output to the adder, to thereby obtain a multiplication result of the multiplier and the multiplicand based upon the output from a final stage of the unit calculation blocks; a first selection circuit for selectively outputting to the adder either a logic product of the multiplier bit input to the unit calculation block and the multiplicand bit input to the unit calculation block for a one unit period, or a logic product of the multiplier bit input to the unit calculation block and the multiplicand bit input to the unit calculation block during a unit time period preceding the one unit period, the first selection circuit including a second delay circuit having an output connected with an input of the logical product circuit, and a selector switch having an input connected to receive the multiplicand, a first output connected with an input of the delay circuit and a second output connected directly to the input of the logical product circuit; and a second selection circuit connected to the first delay circuit and the adder for selecting an input supplied to the adder from either a carry output of the adder delayed for a predetermined time period, or a predetermined value. The multiplier circuit further includes a third delay circuit connected with the unit calculation blocks for delaying an output of a previous stage of the unit calculation blocks for a predetermined time period to produce a delayed output, and for inputting the delayed output into a next stage of the unit calculation blocks.

DESCRIPTION OF THE PREFERRED EMBODIMENTS

Figure 1:
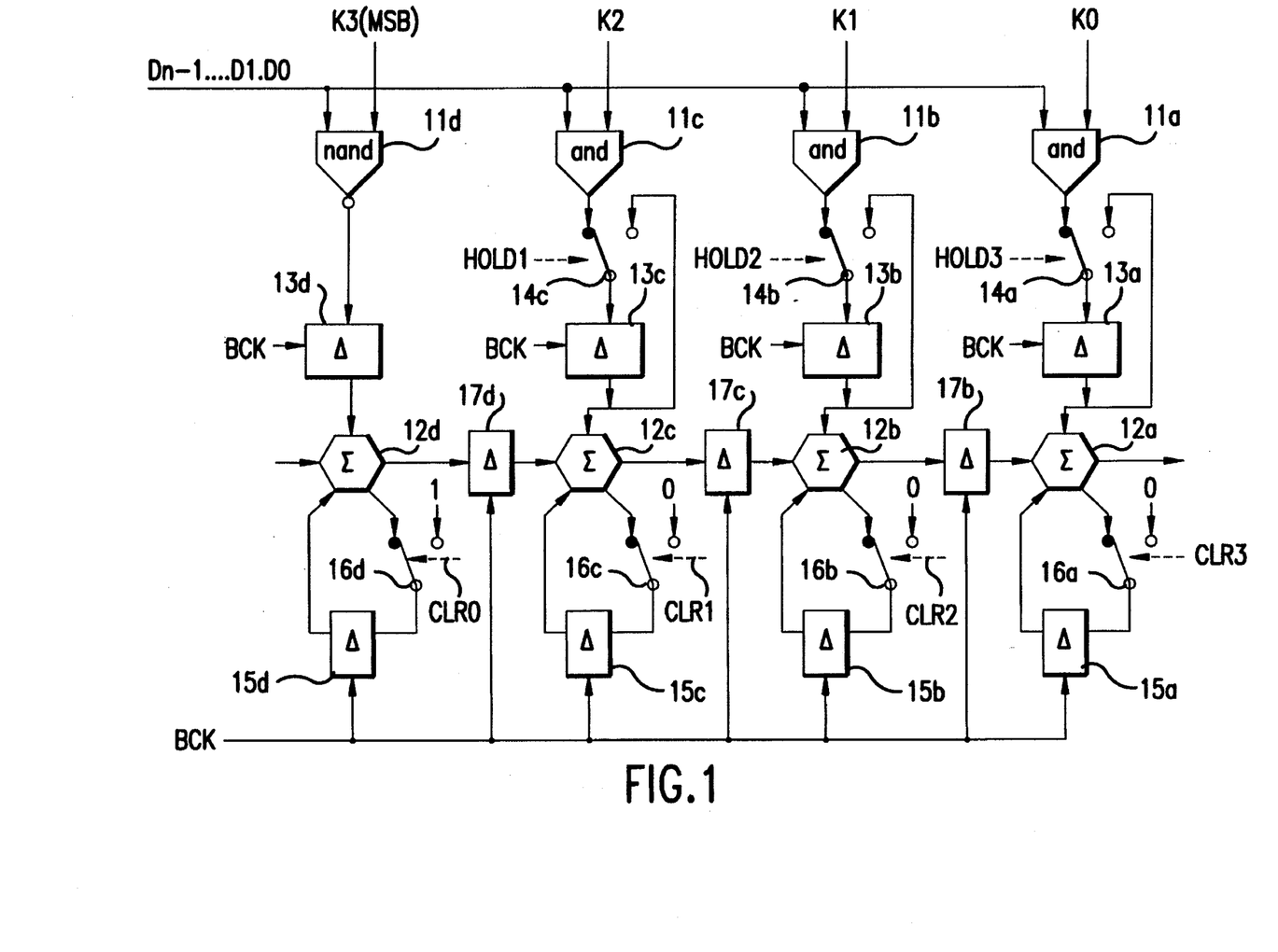
FIG. 1 is a block diagram showing the arrangement of a serial/parallel type multiplier according to a first embodiment of the present invention.
Figure 2:
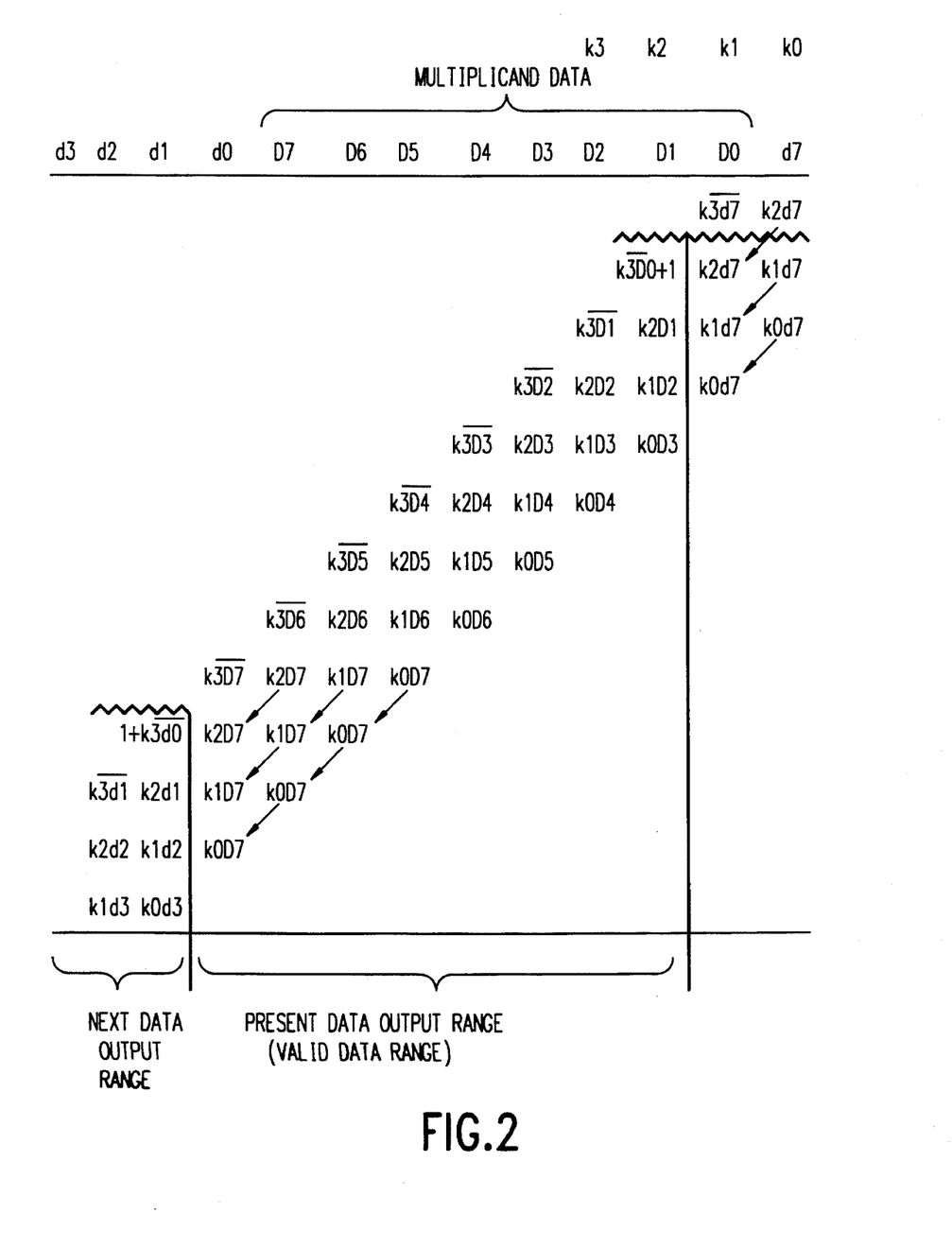
FIG. 2 is a graph illustrating the calculation operation performed in the multiplier of FIG. 1 according to the first embodiment of the present invention.
Figure 3:
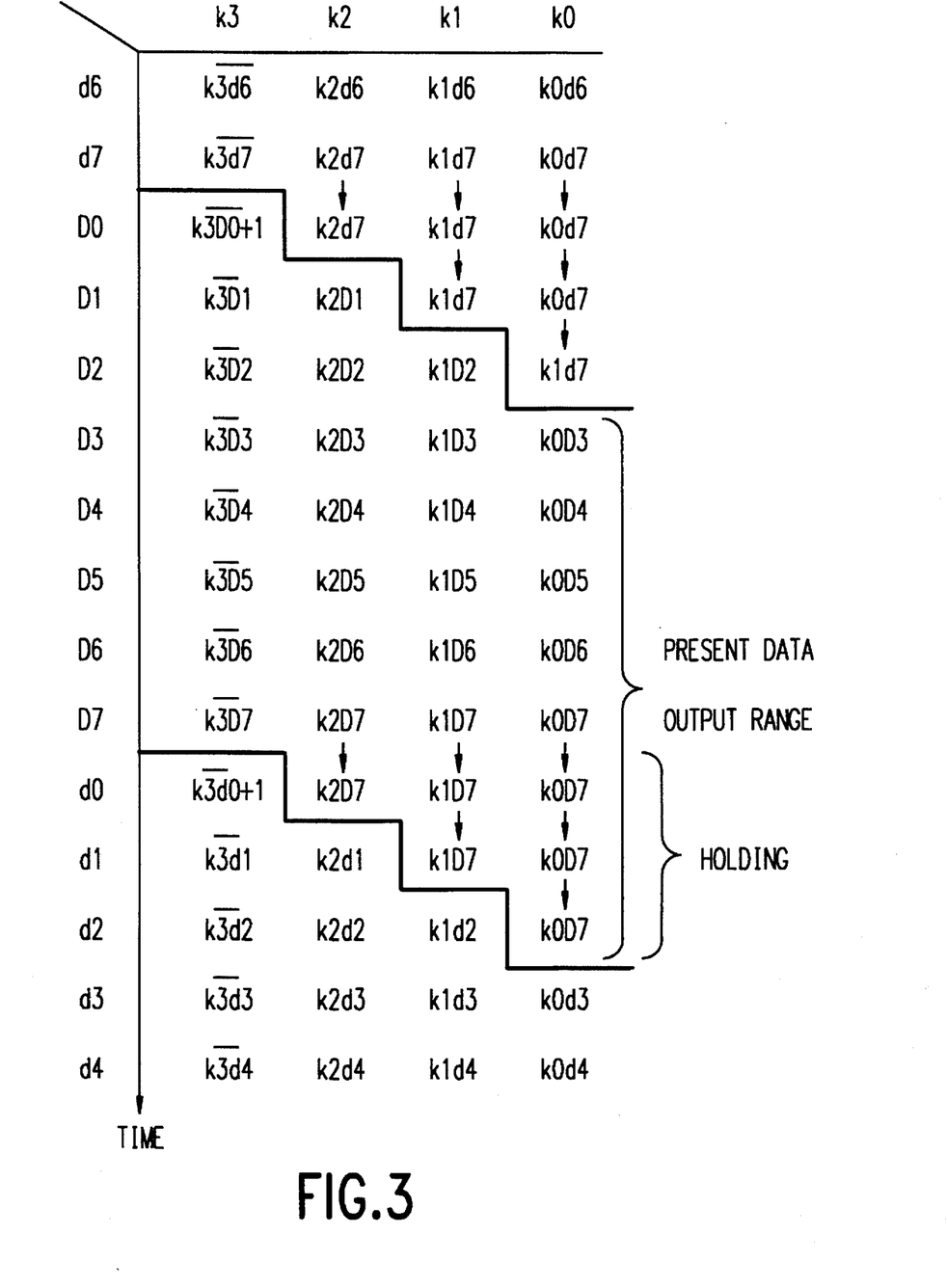
FIG. 3 is a graph illustrating the calculation operation performed in the multiplier of FIG. 1 according to the first embodiment of the present invention.
Figure 4:
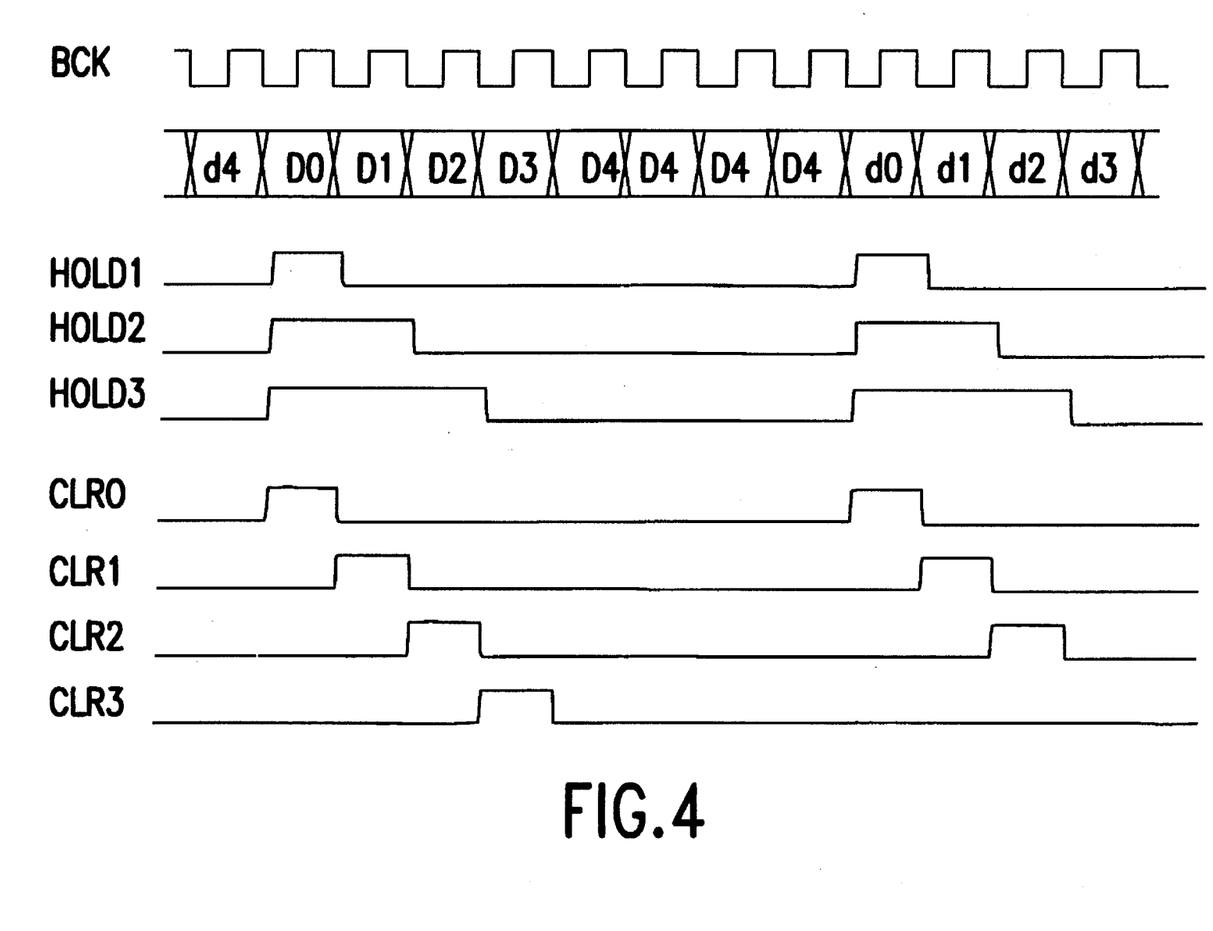
FIG. 4 is a time chart illustrating the operation of the selection circuits 14a to 14c and the selection circuits 16a to 16d according to the first embodiment of the present invention.

FIGS. 1 to 4 represent a first embodiment of the present invention. FIG. 1 is a block diagram representing an arrangement of a serial-to-parallel (serial/parallel) type multiplier according to the present invention. FIG. 2 and FIG. 3 are graphs for showing calculation operations performed by the multiplier shown in FIG. 1. FIG. 4 is a time chart for showing operations of selection circuits 14a to 14c and selection circuits 16a to 16d indicated in FIG. 1. The following describes how multiplication between multipliers K0 to K3 (symbol K0 denotes LSB and symbol K3 represents a sign bit) indicated by a 2's complement and multiplicands D0 to D7 (symbol D0 shows LSB and symbol D7 denotes a sign bit) indicated by a 2's complement is carried out in the serial/parallel multiplier shown in FIG. 1.

First, the respective structural elements of the serial-to-parallel type multiplier indicated in FIG. 1 will be explained. AND gates 11a to 11c and a NAND gate 11d (referred to as logical product circuits, where required) obtain a logic product between the multipliers K0 to K3 which are input in parallel to the multiplier and the multiplicands D0 to D7 which are sequentially input in series to the multiplier every 1 clock time period. Full adders 12a to 12d add the outputs of the logical product circuits 11a to 11d, the output from the previous stage, and the carry output, and output the summation output to the next stage. Delay circuits 13a to 13d delay input data by 1 clock time period in response to a clock signal BCK, and are arranged by, for instance, master/slave D-type flip-flops. Selection circuits 14a to 14c select one of the outputs from the logical product circuits 11a to 11c and the outputs from the delay circuits 13a to 13c in response to control signals HOLD 3 to HOLD 1 from a control circuit (not shown), and supply the selected outputs to the delay circuits 13a to 13c. The delay circuits 15a to 15d delay the carry outputs derived from the full adders 12a to 12d by 1 clock time period and are formed by, for example, master/slave D-type flip-flops. Selection circuits 16a to 16d select either the output from the delay circuits 15a to 15d or preselected constants (for CLR0, a logic value is "1" and for CLR1 to CLR3, a logic value is "0"), and input the selected values to the delay circuits 15a to 15d.

The above-described AND gate 11a, full adder 12a, delay circuit 13a, selection circuit 14a, delay circuit 15a, and selection circuit 16a constitute a first unit calculation block. Similarly, a second unit calculation block is constructed of the above-mentioned AND gate 11b and the like, a third unit calculation block is constructed of the AND gate 11c and the like, and a fourth unit calculation block is constructed of the NAND gate 11d and the like. The delay circuits 17d to 17b delay the respective summation outputs derived from the full adders 12d to 12b by 1 clock time period and output the delayed summation outputs to the full adders 12c to 12a. In other words, the delay circuits 17d to 17b delay the outputs of the previous staged unit calculation blocks by 1 block period, and input the delayed outputs to the next stage unit calculation blocks.

Next, referring now to FIGS. 2, 3 and 4, operations of the serial-to-parallel type multiplier shown in FIG. 1 will be explained. Here, this explanation will be set forth based on the following premises. The multipliers K0 to K3 are not changed even when the multiplicands D0 to D7 are changed from present data to subsequent data. It is also assumed that the multiplicands D0 to D7 are continuously changed from present data to subsequent data, that is, when the multiplicands D0 to D7 are changed from the present data to the subsequent data, the data is input into the multiplier at intervals of one clock period.

In a clock time period during which the first multiplicand bit D0 of the present data is input to the multiplier, "K0D0", "K1D0", "K2D0" and "$\overline{\text{K3D0}}$" (namely, an inverted logic value of K3D0) are output from the logical product circuits 11a to 11d. At this time, as shown in FIG. 4, the selection circuits 14a to 14c select the outputs of the delay circuits 13a to 13c in response to control signals HOLD3 to HOLD 1. Also, by means of control signals CLR3 to CLR0, only the selection circuit 16d selects a predetermined logic value "1", and the remaining selection circuits 16a to 16c select the carry outputs of the full adders 12a to 12c. Accordingly, the delay circuit 15d is set to a logic value of "1". This setting operation is in order to obtain "$\overline{\text{K3D0}}+1$" as indicated in FIG. 2 and FIG. 3. The data for the preceding clock period which have been stored by the respective delay circuits 13a to 13d, 15a to 15d, and 17b to 17d, are input into the respective full adders 12a to 12d, so that a predetermined adding operation is performed.

In a clock time period during which the second multiplicand bit D1 of the present data is input into the multiplier, "K0D1", "K1D1" "K2D1" and "$\overline{\text{K3D1}}$" are output from the logical product circuits 11a to 11d. At this time, as shown in FIG. 4, the selection circuits 14a and 14b select the outputs of the delay circuits 13a and 13b in response to the control signals HOLD3 to HOLD1, and the selection circuit 14c selects the output from the AND gate 11c. Also, by way of the control signals CLR3 to CLR0, only the selection circuit 16c selects a predetermined logic value of "0", and the remaining selection circuits 16a, 16b and 16d select the carry outputs of the full adders 12a, 12b and 12d. As a consequence, the delay circuit 15c is set to a logic value of "0". Operations of the full adders 12a to 12d are similar to the above operation.

Substantially the same operation as the above operation is carried out in respective clock time periods during which the third multiplicand bit D2 of the present data and the fourth multiplicand bit D3 of the present data are input into the multiplier.

Upon entering the clock time period during which the fifth multiplicand bit D4 of the present data is input into the multiplier, the first calculation data of the present data is first output from the multiplier. In other words, the least significant bit (LSB) of "$(\overline{K3D0}+1)+(K2D1)+(K1D2)+(K0D3)$" is output from the full adder 12a as this first calculation data (refer to FIG. 2 and FIG. 3).

Upon entering the clock time period during which the sixth multiplicand bit D5 of the present data is input into the multiplier the least significant bit of "$(\overline{K3D1})+(K2D2)+(K1D3)$ $(K0D4)$+(carry from the lower bit)" is output from the full adder 12a as the second calculation data of the present data (see FIG. 2 and FIG. 3).

Substantially the same operation as that above is performed in the respective clock time periods during which the seventh multiplicand bit D6 and the eighth multiplicand bit D7 of the present data are input into the multiplier, whereby third and fourth calculation data of the present data are output from the full adder 12a.

Upon completion of the clock time period during which the eighth multiplicand bit D7 of the present data is input into the multiplier, another clock time period is commenced during which the first multiplicand bit "d0" of the subsequent data is input into the multiplier. It should be noted that both the operations of the selection circuits 14a to 14c based upon the control signals HOLD3 to HOLD1 and the operations of the selection circuits 16a to 16d based upon the control signals CLR3 to CLR0 at the time are similar to the above-explained operations performed in the clock time period during which the first multiplicand bit D0 of the present data is input to the multiplier. From the full adder 12a, the LSB of "$(\overline{K3D4})+(K2D5)+(k1D6)+(K0D7)$+(carry from the lower bit) is output as the fifth calculation data of the present data (see FIG. 2 and FIG. 3). As previously described, a major factor is that the selection circuits 14a to 14c select the outputs of the delay circuits 13a to 13c in response to the control signals HOLD 3 to HOLD 1. That is to say, the data of "K0D7", "K1D7" and "K2D7" which have been input to the respective full adders 12a to 12c at this time and which are derived from the respective delay circuits 13a to 13c, are maintained as is by the respective delay circuits 13a to 13c, and these maintained data are utilized also in the next clock time period as the summation data of the respective full adders 12a to 12c.

When the clock time period is commenced during which the second multiplicand bit d1 of the next data is input to the multiplier the LSB of "$(\overline{K3D5})+(K2D6)+(K1D7)+(K0D7)$+(carry of the lower bit)" is output as the sixth calculation data of the present data from the full adder 12a (refer to FIG. 2 and FIG. 3). In other words, the data of "K0D7" held in the delay circuit 13a during the preceding clock time period is employed.

Substantially the same operation as that above is carried out also in the respective clock time periods during which the third multiplicand bit d2 of the next data and the fourth multiplicand bit d3 thereof are input in the multiplier, so that seventh and eighth calculation data of the present data are output from the full adder 12a. Also during these clock time periods, the full adder operation is performed by employing the data of "K0D7", "K1D7" and "K2D7" held in the delay circuits 13a to 13c in the preceding clock time period. It should be noted that the operations executed employing the data held during the preceding clock time period are indicated by arrows in FIG. 2 and FIG. 3.

In accordance with the above, a calculation (multiplication) result of the present data can be obtained. That is, the respective data within the present data output range as shown in FIG. 2 are added to each other in the vertical direction in the same manner as normal addition, thereby obtaining the calculation (multiplication) result of the present data.

As is apparent from FIG. 2, in accordance with this embodiment, the 8-bit multiplicand data can be calculated within 8 (eight) clock time periods, and the calculation can be carried out with higher precision within the same time period as that of a conventional multiplier (in the conventional multiplier shown in FIG. 7, the 5-bit multiplicand data is calculated within 8 clock time periods). In other words, data having the same number of bits can be calculated within a short time period compared with a conventional multiplier. It should be understood that although the several lower bits of the calculation (multiplication) result have been omitted in a similar manner to that of the conventional multiplier, since the valid digit number of this multiplication result can be sufficiently maintained even if these several lower bits are removed, this does not pose a problem.

Figure 5:
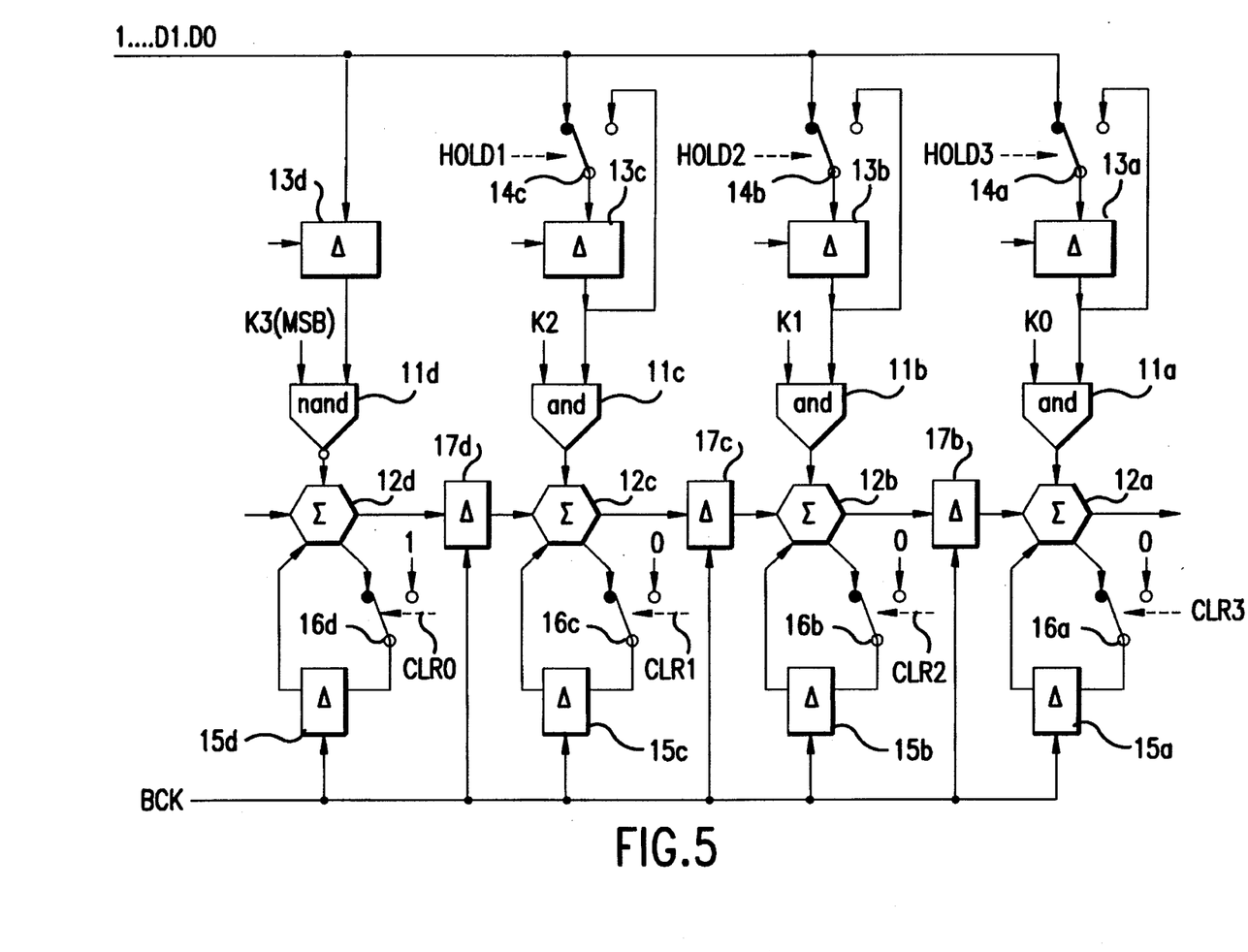
FIG. 5 is a block diagram showing the arrangement of a serial/parallel type multiplier according to a second embodiment of the present invention.

FIG. 5 is a block diagram showing the arrangement of a serial-to-parallel type multiplier according to a second embodiment of the present invention. It should be noted that the basic idea of this embodiment is similar to that of the first embodiment, and thus, the same reference numerals will be employed as those for denoting substantially the same constructions and functions of the first embodiment. As is apparent from a comparison between FIG. 5 (second embodiment) and FIG. 1 (first embodiment), delay circuits 13a to 13d and selection circuits 14a to 14c are provided on the input side of the logical product circuits 11a to 11d in this second embodiment. Since the remaining circuit arrangements of the second embodiment are essentially similar to those of the first embodiment, explanations of operations thereof will be omitted. It should be noted that a similar effect to that of the first embodiment is also achieved in the second embodiment.

It should also be noted that in the multipliers according to the first embodiment and the second embodiment, the selection circuits 16a to 16d may not be employed, but the respective carry outputs from the full adders 12a to 12d may be directly input into the delay circuits 15a to 15d. The delay circuits 16a to 16d are employed so as to set a predetermined constant for the delay circuits 15a to 15d (for CLR0, a logic value "1" is set, and for CLR1 to CLR3, a logic value "0" is set). Such a setting operation may merely give an influence to the summation of the LSB "$\overline{K3D0}+1)+(K2D1)+(K1D2)+(K0D3)$" within the present data output range of FIG. 2. As a consequence, even were these selection circuits 16a to 16d omitted, there would be no significant error in the calculation (multiplication) result.

Thus, in accordance with the present invention, in the unit calculation block, the first selection circuit is employed, which selectively outputs either the logic product between the multiplier bit to be input into this unit calculation block and the multiplicand bit input into this unit calculation block within a one unit time period or the logic product between the multiplier bit to be input into this unit calculation block and the multiplicand bit input into this unit calculation block during the unit time period prior to the above-described one unit time period, so that calculation can be performed with higher precision within the same time period compared with a conventional multiplier. In other words, data having the same number of bits can be calculated within a shorter time period than that of a conventional multiplier.

Also, when the second selection circuit is employed which selects whether the carry output of the adder is delayed for a predetermined time period then input to this adder or whether a predetermined value is input to this adder, it is possible to obtain a calculation result of higher precision.

What is claimed is:

1. A multiplier circuit for multiplying a multiplier formed of a plurality of parallel input multiplier bits by a multiplicand formed of a plurality of multiplicand bits which are sequentially input in series form for each of a plurality of predetermined time periods, said multiplier circuit comprising:

a plurality of series-connected unit calculation blocks, each unit calculation block having one of said multiplier bits and the plurality of multiplicand bits input thereto in units of one bit, each one of said unit calculation blocks forming a stage including:
a logical product circuit for obtaining a logical product between said one of said multiplier bits corresponding to said one unit calculation block and each said multiplicand bit, and for producing an output in response thereto,
an adder for:
adding:
the output from said logical product circuit,
an output from a said unit calculation block which forms a previous stage to said one unit calculation block. and
a carry output from said adder, and
outputting a sum output to a said unit calculation block which forms a next stage to said one unit calculation block,
a first delay circuit for delaying the carry output of the adder for a predetermined time period and inputting the delayed carry output to said adder, to thereby obtain a multiplication result of the multiplier and the multiplicand based upon the output from a said unit calculation block which forms a final stage, and
a first selection circuit for selectively outputting one of the following to said adder:
a logic product of the multiplier bit input to said one unit calculation block and said multiplicand bit input to said one unit calculation block for a one unit period, or
a logic product of the multiplier bit input to said one unit calculation block and the multiplicand bit input to said one unit calculation block during a unit time period preceding said one unit period, and
a second delay circuit connected with the unit calculation blocks for delaying an output of the unit calculation block of the previous stage for a predetermined time period to produce a delayed output, and for inputting the delayed output into the one unit calculation block.

2. A multiplier circuit as claimed in claim 1, wherein each said unit calculation block further includes a second selection circuit connected with said first delay circuit and said adder for selecting an input supplied to said adder as follows:
a carry output of the adder delayed for a predetermined time period, or
a signal having a predetermined value.

3. A multiplier circuit as claimed in claim 2, wherein said second selection circuit includes a selector switch having an output connected to an input of said first delay circuit, a first input connected to an output of said adder and a second input connected to a terminal for receiving said signal having said predetermined value.

4. A multiplier circuit as claimed in claim 1, wherein said logical product circuit of at least one said unit calculation block includes an AND gate.

5. A multiplier circuit as claimed in claim 1, wherein said logical product circuit of a first one of said unit calculation blocks includes a NAND gate.

6. A multiplier circuit as claimed in claim 1, wherein there are four said unit calculation blocks, and said logical product circuit of three of said unit calculation blocks includes an AND gate, and said logical product circuit of the fourth of said unit calculation blocks which precedes said three unit calculation blocks includes a NAND gate.

7. A multiplier circuit as claimed in claim 1, wherein said second delay circuit includes a plurality of delay elements, each said delay element being connected between adders of adjacent unit calculations blocks.

8. A multiplier circuit as claimed in claim 1, wherein said first selection circuit includes:
a third delay circuit having an output connected to an input of said adder, and
a selector switch having an output connected with an input of said third delay circuit, a first input connected with an output of said logical product circuit and a second input connected with the output of said third delay circuit.

9. A multiplier circuit as claimed in claim 1, wherein said first selection circuit includes:
a third delay circuit having an output connected with an input of said logical product circuit, and
a selector switch having an output connected with an input of said third delay circuit, a first input connected to receive said multiplicand, and a second input connected with the output of said third delay circuit.

10. A multiplier circuit for multiplying a multiplier formed of a plurality of parallel input multiplier bits by a multiplicand formed of a plurality of multiplicand bits which are sequentially input in series form for each of a plurality of predetermined time periods, said multiplier circuit comprising:

a plurality of series-connected unit calculation blocks, each unit calculation block having one of said multiplier bits and the plurality of multiplicand bits input thereto in units of one bit, each one of said unit calculation blocks forming a stage including:
a logical product circuit for obtaining a logical product between said one of said multiplier bits corresponding to said one unit calculation block and each said multiplicand bit, and for producing an output in response thereto,
an adder for:
adding:
the output from said logical product circuit,
an output from a said unit calculation block which forms a previous stage to said one unit calculation block, and
a carry output from said adder, and
outputting a sum output to a said unit calculation block which forms a next stage to said one unit calculation block,
a first delay circuit for delaying the carry output of the adder for a predetermined time period and inputting the delayed carry output to said adder, to thereby obtain a multiplication result of the multiplier and the multiplicand based upon the output from a said unit calculation block which forms a final stage, a first selection circuit for selectively outputting one of the following to said adder:
  a logic product of the multiplier bit input to said one unit calculation block and said multiplicand bit input to said one unit calculation block for a one unit period, or
  a logic product of the multiplier bit input to said one unit calculation block and the multiplicand bit input to said one unit calculation block during a unit time period preceding said one unit period,
said first selection circuit including:
  a second delay circuit having an output connected to an input of said adder, and
  a selector switch having an output connected with an input of said second delay circuit, a first input connected with an output of said logical product circuit and a second input connected with the output of said second delay circuit, and
a second selection circuit connected to said first delay circuit and said adder for selecting an input supplied to said adder as follows:
  a carry output of the adder delayed for a predetermined time period, or
  a predetermined value, and
a third delay circuit connected with the unit calculation blocks for delaying an output of the unit calculation block of the previous stage for a predetermined time period to produce a delayed output, and for inputting the delayed output into the one unit calculation block.

11. A multiplier circuit as claimed in claim 10, wherein said second selection circuit includes a selector switch having an output connected to an input of said first delay circuit, a first input connected to an output of said adder and a second input connected to a terminal for receiving said signal having said predetermined value.

12. A multiplier circuit as claimed in claim 10, wherein said logical product circuit of at least one said unit calculation block includes an AND gate.

13. A multiplier circuit as claimed in claim 10, wherein said logical product circuit of a first one of said unit calculation blocks includes a NAND gate.

14. A multiplier circuit as claimed in claim 10, wherein there are four said unit calculation blocks, and said logical product circuit of three of said unit calculation blocks includes an AND gate, and said logical product circuit of the fourth of said unit calculation blocks which precedes said three unit calculation blocks includes a NAND gate.

15. A multiplier circuit as claimed in claim 10, wherein said third delay circuit includes a plurality of delay elements, each said delay element being connected between adders of adjacent unit calculations blocks.

16. A multiplier circuit for multiplying a multiplier formed of a plurality of parallel input multiplier bits by a multiplicand formed of a plurality of multiplicand bits which are sequentially input in series form for each of a plurality of predetermined time periods, said multiplier circuit comprising:
  a plurality of series-connected unit calculation blocks, each unit calculation block having one of said multiplier bits and the plurality of multiplicand bits input thereto in units of one bit, each one of said unit calculation blocks forming a stage including:
    a logical product circuit for obtaining a logical product between said one of said multiplier bits corresponding to said one unit calculation block and each said multiplicand bit, and for producing an output in response thereto,
  an adder for:
    adding:
      the output from said logical product circuit,
      an output from a said unit calculation block which forms a previous stage to said one unit calculation block, and
      a carry output from said adder, and
    outputting a sum output to a said unit calculation block which forms a next stage to said one unit calculation block,
  a first delay circuit for delaying the carry output of the adder for a predetermined time period and inputting the delayed carry output to said adder, to thereby obtain a multiplication result of the multiplier and the multiplicand based upon the output from a said unit calculation block which forms a final stage,
  a first selection circuit for selectively outputting one of the following to said adder:
    a logic product of the multiplier bit input to said one unit calculation block and said multiplicand bit input to said one unit calculation block for a one unit period, or
    a logic product of the multiplier bit input to said one unit calculation block and the multiplicand bit input to said one unit calculation block during a unit time period preceding said one unit period,
  said first selection circuit including:
    a second delay circuit having an output connected with an input of said logical product circuit, and
    a selector switch having an output connected with an input of said second delay circuit, a first input connected to receive said multiplicand, and a second input connected with the output of said second delay circuit, and
  a second selection circuit connected to said first delay circuit and said adder for selecting an input supplied to said adder as follows:
    a carry output of the adder delayed for a predetermined time period, or
    a predetermined value, and
  a third delay circuit connected with the unit calculation blocks for delaying an output of the unit calculation block of the previous stage for a predetermined time period to produce a delayed output, and for inputting the delayed output into the one unit calculation block.

17. A multiplier circuit as claimed in claim 16, wherein said second selection circuit includes a selector switch having an output connected to an input of said first delay circuit, a first input connected to an output of said adder and a second input connected to a terminal for receiving said signal having said predetermined value.

18. A multiplier circuit as claimed in claim 16, wherein said logical product circuit of at least one said unit calculation block includes an AND gate.

19. A multiplier circuit as claimed in claim 16, wherein said logical product circuit of a first one of said unit calculation blocks includes a NAND gate.

20. A multiplier circuit as claimed in claim 16, wherein there are four said unit calculation blocks, and said logical product circuit of three of said unit calculation blocks includes an AND gate, and said logical product circuit of the fourth of said unit calculation blocks which precedes said three unit calculation blocks includes a NAND gate.

21. A multiplier circuit as claimed in claim 16, wherein said third delay circuit includes a plurality of delay elements, each said delay element being connected between adders of adjacent unit calculations blocks.

* * * * *